United States Patent [19]
Welch et al.

[11] Patent Number: 5,528,935
[45] Date of Patent: Jun. 25, 1996

[54] STRESS AND VELOCITY GAUGE

[75] Inventors: Charles R. Welch; Billy D. Fuller; Howard G. White, all of Vicksburg, Miss.

[73] Assignee: The United States of America as represented by the Secretary of the Army, Washington, D.C.

[21] Appl. No.: 555,558

[22] Filed: Nov. 8, 1995

[51] Int. Cl.⁶ .................................................. G01P 15/08
[52] U.S. Cl. ............................ 73/493; 73/774; 73/652
[58] Field of Search ............................ 73/493, 495, 594, 73/763, 767, 774, 784, 786, 855, 760, 654, 652; 340/521, 691, 693

[56] References Cited

U.S. PATENT DOCUMENTS

| 5,233,871 | 8/1993 | Schwarz | 73/493 |
| 5,361,642 | 11/1994 | Welch | 73/774 |
| 5,447,065 | 9/1995 | Welch | 73/493 |

Primary Examiner—Hezron E. Williams
Assistant Examiner—Christine K. Oda
Attorney, Agent, or Firm—Luther A. Marsh

[57] ABSTRACT

A stress and motion gauge formed in a unitary housing has a free field stress gauge and a velocity gauge formed in the housing in proximate side by side arrangement. The stress and velocity gauge of the invention measures, in a single package, both normal stress and material velocity at essentially the same location in a material.

21 Claims, 3 Drawing Sheets

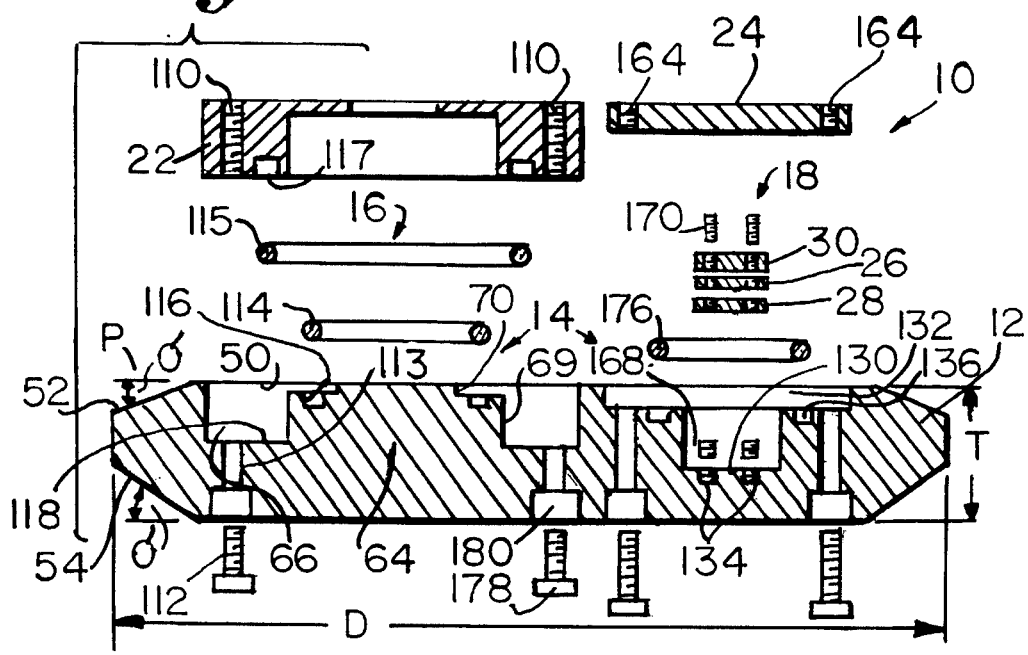

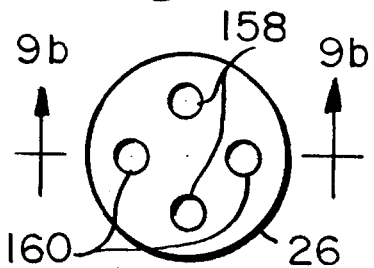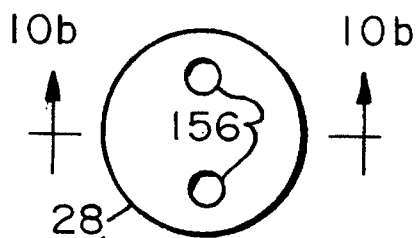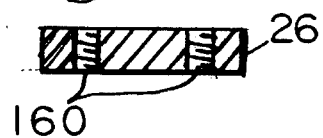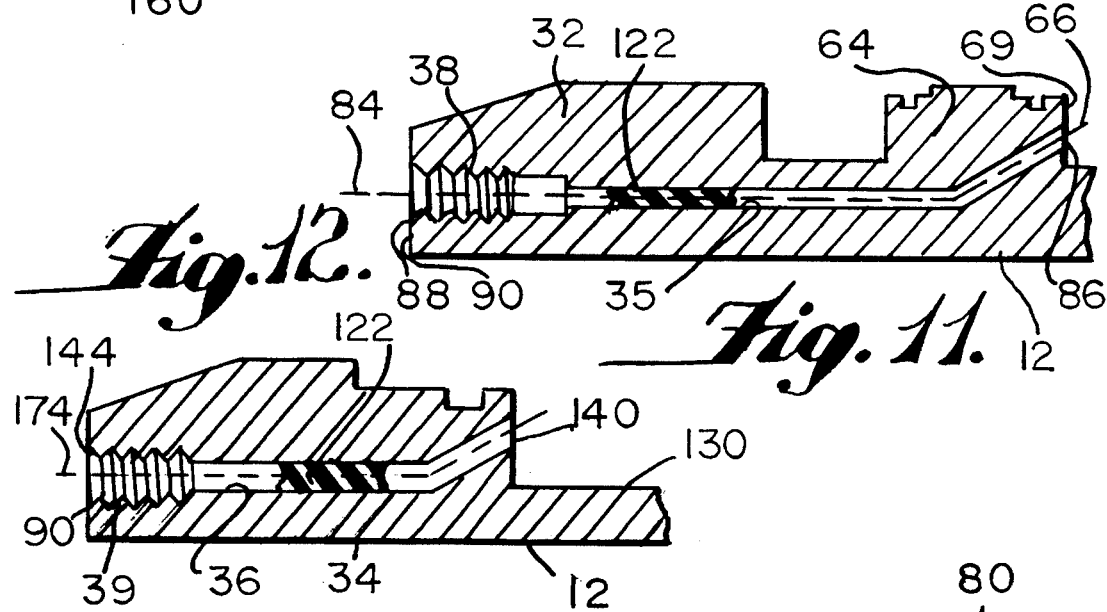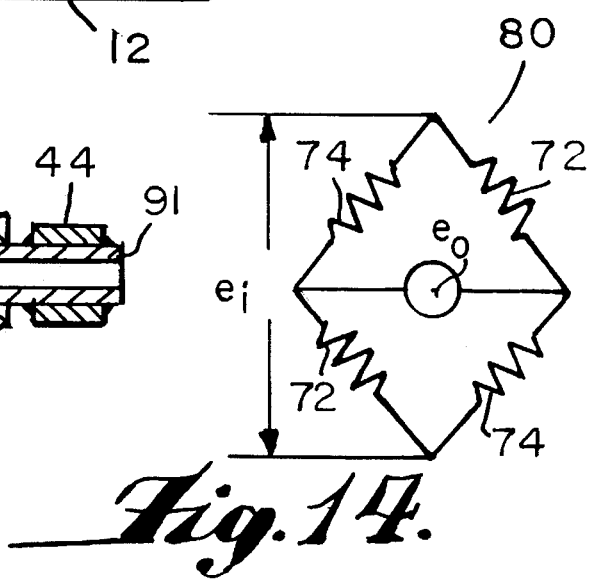

STRESS AND VELOCITY GAUGE

STATEMENT OF GOVERNMENT INTEREST

The invention described herein may be manufactured and used by or for the Government of the United States of America for governmental purposes without the payment of any royalties thereon.

FIELD OF THE INVENTION

This invention relates to stress and motion gauges, and more particularly to a combined instrument for measuring proximately occurring stress and strong motions in various media, including geological rock and soil formations, concrete, asphalt and other materials. The gauge design is especially durable and robust for measuring transient motion and stresses associated with the strong motions, for example, those caused by explosions and earthquakes. The gauge can also be incorporated and measure static stresses in smart structures such as bridges, buildings or roads.

BACKGROUND OF THE INVENTION

The invention is an improvement over inventions described in U.S. Pat. No. 5,361,642 to Charles R. Welch, entitled the Column-Based Stress Gage, which issued Nov. 8, 1994, and U.S. Pat. No. 5,447,065 to Charles R. Welch et al., entitled High-Fidelity Particle Velocity Gage For Measuring Strong Motions in a Solid Media which issued Sep. 5, 1995, the teachings of which are incorporated herein by reference. The patents are commonly assigned to the United States of America.

One method to measure normal stress and velocity at a given location in a material uses the two instruments described in the above noted patents separately. In the method, the column-based stress gauge and the high-fidelity velocity gauge are placed independently, sometimes in pairs, with each instrument physically separated from the other instrument. Because the stress and velocity measurements are best interpreted as pairs of measurements, the physical separation of the instruments increases the complexity of the data interpretation, which increases the chances of interpretation errors. The separate placement for each instrument also increases the possibility of errors in the coupling between the pair of instruments and the surrounding medium, and this consequently increases the likelihood of errors in data interpretation.

Another method of measuring normal stress and material velocity at nearly the same location is to use some of the other types of stress and velocity gauges in existence and combine these in a single package. These other stress and velocity instruments lack the advantages of the aforementioned patents. In addition, in some cases, the external shape of so-called velocity gauges used in these other methods compromise normal stress measurements made in proximity to such velocity canisters.

SUMMARY OF THE INVENTION

The present invention provides proximate stress and motion measurements in an instrument including a unitary housing or gauge body, a free field stress gauge formed in the gauge body, which may operate in a medium with ambient normal stress fields of the order of 10 kilobars and a velocity gauge including an accelerometer formed in the gauge body adjacent the stress gauge and being isolated from deformation of the gauge body.

Accordingly, it is an object and advantage of the present invention to provide a combined free field stress gauge that can accurately operate in normal stress fields in the ten kilobar range and a high-fidelity particle velocity gauge having a sensor proximate to but isolated from the effects of the stress field.

The stress and velocity gauge of the invention measures both normal stress and material velocity at essentially the same location in a material. The normal stress is a measure of the potential energy of the material at a particular location. The normal velocity is a measure of the kinetic energy of the material at a particular location. Measuring these two quantities at a given location in a solid subjected to transient loading is important in understanding material behavior, in understanding the wave state in the material, in identifying the presence, location and type of material boundaries near the measurement, and in quantifying the energy in the material at the point of the measurement. For these purposes, it is best that the normal stress and velocity measurements be made at the same location, because, as the distance between the stress and velocity measurements increases, the complexity of the analysis increases considerably, as does the chance of misinterpretation of the data.

The stress and velocity gauge of the invention is a single package. Accordingly, placement of the instrument in the material is considerably easier than placing two separate instrument packages. Separate instrument placement requires that location surveys of the instruments be made to insure the location of each instrument in the motion and stress field. Such placement also requires that the material immediately surrounding each instrument be judiciously chosen and carefully placed to ensure good coupling between the transducer and the surround medium. Combining stress and velocity measurements in a single instrument, reduces by a factor of two the number of times this process must be accomplished in order to make a given number of pairs of velocity and stress measurements. This, in turn, reduces by a similar amount the effort and time required to make these measurements.

The coupling between stress and velocity transducers and the surrounding medium must be proper in order for the associated measurements to be accurate. The chances of correct coupling for the stress and velocity pair of measurements is improved for the stress and velocity gauge of the invention, because this coupling is affected on only one transducer body, for both the normal stress and material velocity measurements.

Poor coupling between a transducer body and the surrounding medium is more apparent in stress measurements than in velocity measurements. This is because the stresses are significantly reduced by poor coupling, while the velocities may be only moderately reduced, or may oscillate about the mean material velocity. Detection of poor coupling for the associated velocity measurement is significantly improved over that which would occur for velocity measurements made independently, because according to the invention, a stress measurement is made in the same body as the velocity measurement. Detection of poor coupling is important to prevent misinterpretation of the data.

The space required for measuring stress and velocity, including the volume of material whose motion and stresses are perturbed by the measuring instruments, is significantly reduced by using the stress and velocity gauge of the invention from that which would be required if separate velocity and stress instruments are used. Frequently there is only limited measurement space available in studies of shock phenomena associated with explosion tests, or in documenting the motions and stresses around mining operations.

The stress and velocity gauge of the invention economically contains all of the novel features and advantages set forth in the aforementioned column-based stress gauge and the high-fidelity particle velocity gauge in a single measuring package.

BRIEF DESCRIPTION OF THE INVENTION

FIG. 1 is an exploded cross-sectional view of a stress and velocity gauge according to the invention;

FIG. 2 is a top plan view of the gauge body;

FIG. 9A is a top plan view of the steel mounting plate for the velocity sensor;

FIG. 9B is a cross-sectional view of the steel mounting plate taken along lines 9B—9B of FIG. 9A;

FIG. 10A is a top plan view of a polymeric bearing of the velocity sensor;

FIG. 10B is a cross-sectional view taken along lines 10B—10B of FIG. 10A;

FIG. 11 is a fragmentary side sectional view of the stress sensor cable pathway taken along lines 11—11 of FIG. 2;

FIG. 12 is a fragmentary side sectional view of the velocity sensor pathway taken along lines 12—12 of FIG. 2;

FIG. 13 is a fragmentary side sectional view of a steel tubing gland nut and ferrule assembly according to the invention; and FIG. 14 is a schematic circuit design employing a Wheatstone-Bridge for the stress sensor of the invention.

DESCRIPTION OF THE INVENTION

Figure 3:
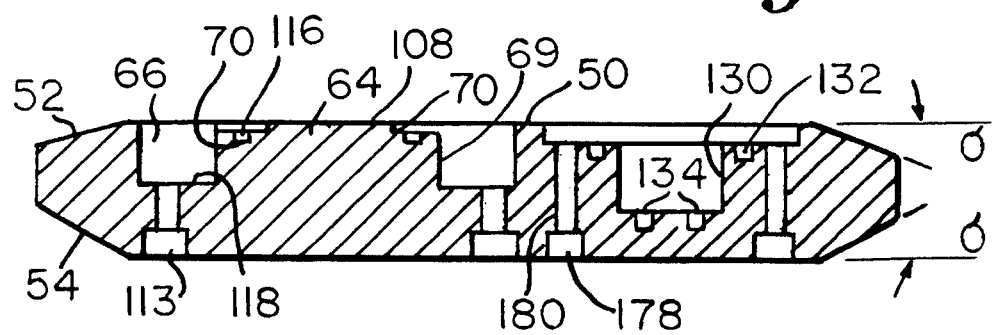
FIG. 3 is a cross-sectional view of the gauge body.
Figures 4, 5, 6:
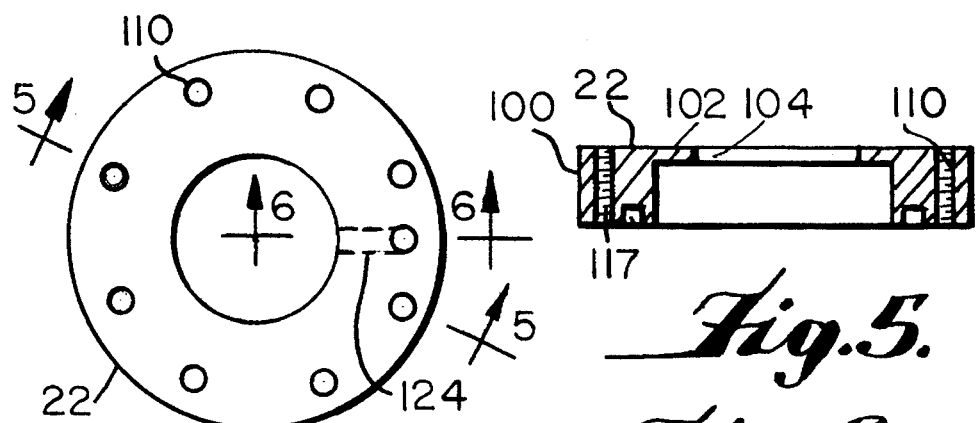
FIG. 4 is a top plan view of the stress sensor cover.
FIG. 5 is a cross-sectional view of the sensor cover taken along lines 5—5 of FIG. 4.
FIG. 6 is a fragmentary cross-section taken along lines 6—6 of FIG. 4.

The stress and velocity gauge 10 of the invention comprises a unitary housing or gauge body 12 incorporating a sensing assembly 14 including a stress sensor 16, a velocity sensor 18 and a cable-protection assembly 20.

Figure 7:
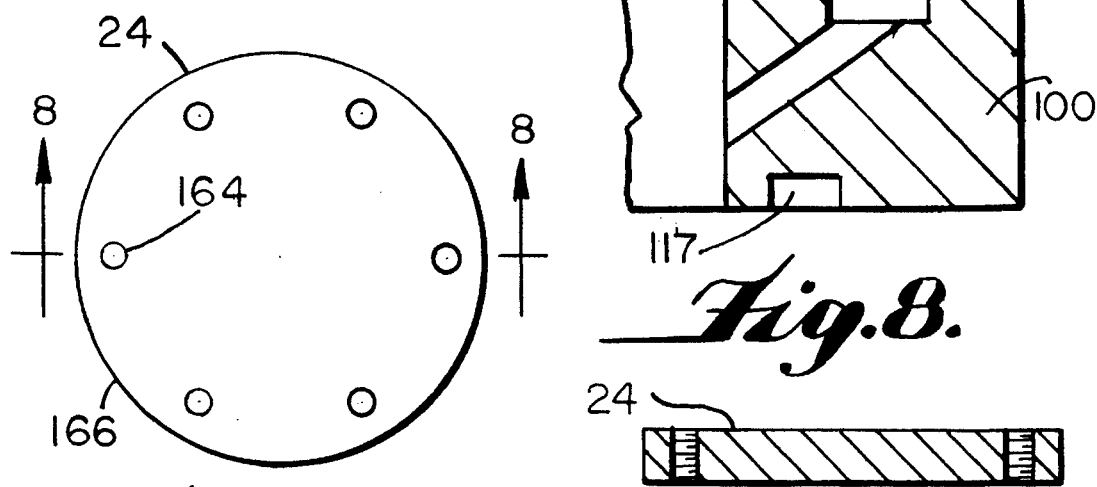
FIG. 7 is a top plan view of the velocity sensor cover.
Figure 8:
FIG. 8 is a cross-section view of the velocity sensor cover.

The sensing assembly 14 comprises gauge body or housing 12 (FIGS. 1–3), stress sensor cover 22 (FIGS. 1, and 4–6), velocity sensor cover 24 (FIGS. 7–8), a relatively stiff steel mounting button 26 (FIGS. 9A–9B) and a tough, low coefficient of friction, polymeric (Teflon) bearing 28 (FIGS. 10A–10B) and an accelerometer 30.

The cable protection assembly 20 comprises two subassemblies and 34 (FIGS. 2, 11–13) partly incorporated in the gauge body 12. Each subassembly 32 and 34 comprises a respective pathway 35 and 36 having a threaded opening 38 and 39, in the gauge body 12 and a corresponding cable protection device 40 (FIG. 13) comprising a miniature gland nut 42, a stainless steel ferrule 44, and a small diameter (e.g., 3/16 inch O.D. by 0.090 I.D.) stainless alloy tube 46 (e.g., stainless alloy 304, 316 or 321).

The gauge body 12 (FIG. 1) is machined from a single piece of material. The choice of materials for the gauge body 12 is determined predominantly by the requirements for the stress sensor, and to a lesser extent by the velocity sensor. These requirements dictate that the overall modulus for the gauge 10 be significantly higher than the medium in which the stresses are to be measured, and that the average density of the gauge 10 be as close as practical to that of the medium. Thus, aluminum alloy 7075-T6 may be advantageously used for measurements in soils, while steel alloy 4340, heat-treated to 180 ksi yield strength, may likewise be advantageously used to make measurements in concrete or rock.

The gauge body 12 is plate-like, having a diameter (D) to thickness (T) in a ratio greater than or equal to about five. The measuring direction of the gauge 10, for both the stress and the velocity measurements, is normal to the plane (P) of the gauge body 12. The minimum thickness T of the gauge body 12 is sufficient to withstand the contemplated stress levels. For example, for a 4340 steel alloy, such minimum thickness T is about 0.8 inches, and is sufficient to withstand about 10 kilobars stress. In order to increase accuracy and sensitivity, the density of the gauge body 12 may be selected so as to be approximately equal to the density of the sensed material. Further, the average elastic Young's modulus of the gauge body 12 material may be selected to be higher than the sensed medium resulting in a relatively high ratio of support area to load area. In addition, the mass of the gauge divided by the area of the disc normal to the measuring axis is small. This causes the gauge to follow the motion of the sensed material more faithfully. In an exemplary embodiment, the ratio is at least about 0.017 $m^2/kg$.

The top portion 50 of the gauge body 12 is beveled along its top entire edge 52 at an angle δ of about 30 degrees. The bottom edge 54 is beveled at a similar angle δ over an arc of approximately 260 degrees. The cable protection subassemblies 34 and 32, one each respectively for the velocity sensor 18, and for the stress sensor 16, are partly formed in the gauge body 12 in an arcuate section 37 extending over an angle θ of approximately 100 degrees, and the cable protection device 40 is threaded one each into the corresponding threaded openings 38 and 39. The lower bevel surface 54 does not extend into the arcuate section 37.

Two circular regions 60, 62 are machined into the gauge body 12. One of these regions is for the stress sensor 16, while the other is for the velocity sensor 18.

The region machined for the stress sensor 16 (FIGS. 1–3) comprises a solid central column 64 surrounded by an annulus 66. The column 64 is used to sense the normal stress applied by the medium to the gauge surface. The column 64 has two machined flats 68 on opposite sides of its lateral surface or sidewall 69. A flat annulus 70 is also machined along the edge of the top surface of the central column 64.

Commercially-available semiconductor strain gauges 72 (for example, Kulite Semi-Conductor, Inc., semiconductor strain gauge model S-UEP-3560-90) are applied to the flats 68 on the lateral surface 69 of the sensing column 64 to sense the axial straining of the column. Commercially available foil strain gauges 74 (for example, Micro-Measurements Group, Inc., foil strain gauge Model EA-06-125-BZ-350) are applied to the lateral surfaces 69 of the sensing column 64 at approximately ninety degrees relative to the flats 68 where the semiconductor strain gauges 72 are located. The foil strain gauges 74 measure the circumferential, or Poisson, strains in the column 64. All strain gauges are installed using manufacturer recommended procedures. Alternatively, the strain gauges may be fiberoptic strain sensors.

The semiconductor strain gauges 72 and the foil strain gauges 74 are electrically configured in a full Wheatstone-Bridge circuit 80 (FIG. 14), with the semiconductor strain gauges 72 comprising two opposite arms of the bridge circuit 80, and the foil strain gauges 74 comprising the other two opposite arms of the circuit.

Pathway 35 (FIG. 11) for carrying a four-conductor signal cable 84 (shown in dotted line), from the Wheatstone-Bridge 80 out of the gauge body 12 runs transverse to and beneath the column 64 in the lower portion of the gauge body 12 (FIGS. 1, 2 and 11). In the interior of the gauge 12, the pathway 82 angles up into the annulus 66 through the side 69 of the column 64 at the egress point 86. At the opposite end of the pathway 35 another point-of-egress 88 is located along the exterior surface 90 of gauge body 12. The hole is enlarged and appropriate internal threads 38 are machined to allow a secure attachment of the cable protection device 40 (FIG. 13). The cable protection device 40 is used to protect the signal cable 84 as it leaves the gauge body 12 and traverses the stress environment sensed by the gauge. The cable 84 is knotted just inside the gauge body 12 and prior to entering the tubing 46, to prevent tensile forces, if applied to the free-end (away from the gauge) of the cable, from being applied to the interior strain gauge circuit of the sensing column. The gland nut 42 is a threaded sleeve for receiving the steel tube 46 (e.g., 304, 310 or 910 SS tube, 3/16" O.D. ×0.090" D). The ferrule 44 of similar material is welded to the free end 91 of the tube 46.

The stress sensor cover 22 (FIG. 5) is machined from a single piece of material. This material is chosen to be the same as that used for the gauge body 12. The stress sensor cover 22 comprises a ring-section 100 underlying a flat-washer section 102. The flat-washer section 102 has a large hole 104 machined through its center. When assembled onto the gauge body 12, the ring-section 100 mates onto the annulus 66 of the stress-sensing cavity of the gauge body 12, while the flat washer section 102 overlays and contacts the flat beveled edge 70 of the stress-sensing column 64. This allows the central, non-beveled portion 108 of the stress-sensing column 64 to protrude through the hole 104 in the flat-washer section 102 of the cover 22, and make direct contact with the sensed medium. Holes 110 are drilled and tapped through the ring-section 100 of the stress sensor cover 22, near the outer edge (FIG. 3). Screws 112 pass through the corresponding holes 113 in the gauge body 12 (FIG. 2) and into these threaded holes to clamp the stress sensor cover 22 to the gauge body 12.

Two watertight seals 114 and 115, for example, an o-ring seal or copper washer seal, are used to provide initial sealing between the stress sensor cover and gauge body. The seal 114 is located in recess 116 of the recessed top edge 70 of the stress-sensing column 64 for engagement with the confronting surface of the flat washer section 102 of the stress sensor cover 22. Seal 115 is located in a recess 117 of the cover for confronting the lower surface 118 of the annulus 66. When the gauge 10 is subjected to exterior pressures, the seals 114 and 115 cause a pressure differential between the interior and exterior of the gauge which, in turn, causes metal-to-metal contact between the stress sensor cover 22 and the gauge body 12 as the pieces deform, thus providing better sealing at high pressures.

For dynamic stress environments in which the gauge 10 is subjected to high accelerations, the annulus 66 of the stress sensor 16 is completely filled with a relatively soft (compared to the gauge body), but strong low density material 122 (for example, Emerson and Cuming, Inc. Stycast Foam 1090SI) to hold strain gauge wires 84 and solder tabs fixed relative to the gauge body 12. Fill hole 124 (FIG. 6) for placement of this material are drilled into the stress sensor cover 22. Appropriate sealing mechanisms are used to seal the fill hole 124.

The region machined for the velocity sensor 18 (FIGS. 1–3) comprises a flat-bottomed circular cavity 130 surrounded by a shallow flat annulus 132. Two holes 134 are drilled and tapped into the bottom of the cavity 130. An o-ring gland 136 is machined into the shallow annulus 132. A small cable pathway 36 (FIGS. 2 and 12) runs from egress 140 in the circular cavity 130 to cable egress point 144 along the non-beveled edge 90 of the gauge body 12. At the cable egress point 144 along the exterior of the gauge body, the pathway is enlarged and threads 39 are machined into the gauge body 12 for attaching a cable protection device 40, similar to the construction described above for protecting the cable pathway of the stress sensor.

Velocity sensor 18 further includes a velocity sensor cover 24 (FIG. 7), a steel mounting button 26 (FIGS. 9A–9B) and a Teflon or polymeric bearing 28 (FIGS. 10A–10B).

The mounting button 26 and bearing 28 are both small disks of similar diameter. The bearing 28 has two holes 156 drilled through it. The mounting button 26 has two holes 158 drilled through it, which match the holes 156 of the bearing 28, and two holes 160 drilled and tapped in it, which allow for the attachment of commercial accelerometer 30 such as an Endevco Model 7072-A High Range-Accelerometer.

The velocity sensor cover 24 is disk-shaped and is machined, for example, from 4340 steel, hardened (after machining) to a tensile strength of 180 ksi. Holes 164 are drilled and tapped into the velocity sensor cover 24 along its outer edge 166.

To assemble the velocity sensor portion 18, the steel mounting button 26 and the Teflon bearing 28 are assembled one above the other and affixed to the bottom of the circular cavity 130 in the gauge body 12. This is done by means of machine screws 168 which pass through the smooth bore holes 158 of the steel mounting button 26 and through the holes 156 in Teflon bearing 28, and into the tapped holes 134 in the bottom of the circular cavity 130. The length of the screws, and the torque applied to the screws, are such as to firmly and securely affix the steel mounting button-Teflon bearing assembly to the gauge body.

The commercial accelerometer 30 is then mounted onto the steel mounting button 26 using screws 170 which pass through the accelerometer 30 into the threaded holes 160 in the steel mounting button 26. A cable 174 from the accelerometer 30 exits the gauge body 12 through the cable pathway 36. At the egress point 140 a knot is formed in the cable 174. This knot serves to prevent tensile forces, if applied to the free-end of the cable, from being applied to the accelerometer 30.

An o-ring 176 is next placed in the gland 136 or small annulus which surrounds the circular cavity 130. The velocity sensor cover 24 is then affixed to the gauge body 12 using screws 178 which pass through holes 180 in the gauge body and into the threaded holes 164 in the velocity sensor cover 24.

The free-end of the accelerometer cable 174 is next threaded through one of the cable protection subassemblies 40 (FIG. 13), with the gland nut 42 of the subassembly then threaded into the threads 39 at the end of the cable pathway 36.

The free-end of the four-conductor cable 84 to the stress sensor Wheatstone-Bridge is likewise threaded through the other cable protection subassembly, with the gland nut of this subassembly threaded into the threads 38 at the end of the other cable pathway 35.

Another possible alternative of the gauge 10 includes the use of inductance or capacitance detection schemes that transduce mechanical deformations of where the gauge parts to cause changes in inductance or capacitance characteristics of a monitored electrical circuit that includes the gauge parts.

While there have been described what are at present considered to be the preferred embodiments of the present invention, it will be apparent to those skilled in the art that various changes and modifications may be made therein without departing from the invention, and it is intended in the appended claims to cover such changes and modifications as fall within the spirit and scope of the invention.

What is claimed is:

1. A stress and velocity gauge for sensing stress and velocity fields in a sensed medium comprising:

a unitary gauge body in the form of a first disc;

a stress gauge portion and a velocity gauge portion adjacent thereto being formed in the gauge body and located proximate in the housing;

said stress gauge portion including a solid central sensing column formed in the first disc having a measuring axis normal thereto for direct contact with the sensed medium, said sensing column having side walls, an internal passage, and being surrounded by an annular void space between the sensing column and an outer portion of the first disc, a second disc adapted to mate with the annular void space in complementary fashion; strain gauge sensors mounted on the sidewalls of the sensing column; and sealing means, wherein at least one of the first disc and the second disc is formed with at least two annular recesses for placement of the sealing means, said first and second discs being fastened together;

said velocity gauge portion being formed in a cavity having a button in the first disc and including;

an accelerometer positioned and adapted to be mounted in the bottom of said cavity; a stiff mounting button, and a tough low coefficient of friction polymer bearing for securing the accelerometer in the cavity, said velocity gauge portion having a measuring axis through a short central axis, a loading area normal to said measuring axis and a diameter dimension transverse to said measuring axis, a third disc for covering the cavity, and sealing means, wherein at least one of the cover and cavity is formed with an annular recess for placement of the sealing means; and said housing having a thickness in the direction of measurement sufficient to withstand contemplated stress levels.

2. A stress and velocity gauge as defined in claim 1 wherein the sensing column wall has diametrically opposed flattened portions and the strain gauge sensors comprise a first and a second strain gauge sensor for sensing longitudinal deformation and a third and a fourth strain gauge sensor for sensing circumferential deformation, the first and second strain gauge sensors being positioned on the flattened portions of the sensing column, and the third and fourth strain gauge sensors being positioned about 90 degrees relative to the first and second strain gauge sensors on the walls of the sensing column of the first disc.

3. A stress and velocity gauge as defined in claim 2 wherein the first and second strain gauge sensors each comprise a semiconductor strain gauge sensor and the third and fourth strain gauge sensors each comprise a foil strain gauge sensor.

4. A stress and velocity gauge as defined in claim 1 wherein the first disc has a top outside edge and a bottom outside edge and the top outside edge and a bottom outside edge of said first disc is beveled at an angle of approximately 30 degrees.

5. The stress and velocity gauge of claim 1 wherein the first disc has a diameter dimension and a thickness dimension and said first disc has an aspect ratio defined as the ratio of the diameter to thickness of at least five.

6. A stress and velocity gauge as defined in claim 1 further including a stabilizing material for potting the sensing means and strain gauge sensors within the body.

7. A stress and velocity gauge as defined in claim 1 wherein the first disc and the second disc are solid and made of at least one of high strength steel, high strength aluminum, and a composite material.

8. A stress and velocity gauge as defined in claim 1 wherein the sealing means comprises at least one of o-rings, and copper washers.

9. A stress and velocity gauge as defined in claim 1 wherein the strain gauge sensor is a fiberoptic strain gauge sensor.

10. A stress and velocity gauge as defined in claim 1 wherein the gauge is a material selected to have a density approximately equal to the density of the sensed medium.

11. The stress and velocity gauge of claim 10 wherein the gauge body material is selected to have an average elastic Young's modulus in a direction of the measuring axis higher than the sensed medium resulting in a relatively high ratio of support area to load area in the direction of the said measuring axis.

12. The stress and velocity gauge of claim 1 wherein said gauge body is machined from a single piece of material.

13. The stress and velocity gauge of claim 1 wherein said stiff mounting plate comprises steel.

14. The stress and velocity gauge of claim 1 wherein said low coefficient friction polymer bearing comprises Teflon.

15. The stress and velocity gauge of claim 1 wherein said stiff mounting plate and said low coefficient friction polymer bearing define a strain isolation means for isolating the accelerometer from deformation.

16. The stress and velocity gauge of claim 1 wherein said first disc comprises at least one of 7075-T6 aluminum and 4340 steel.

17. The stress and velocity gauge of claim 1 wherein said third disc comprises 4340 steel.

18. The stress and velocity gauge of claim 1 wherein said third disc comprises a plate removably fixed to said first disc.

19. The stress and velocity gauge of claim 1 wherein said accelerometer, said stiff plate and said polymer bearing are removably fixed to said bottom section by common fastening means.

20. The stress and velocity gauge of claim 1 wherein a ratio of loading area normal to the measuring axis of the gauge to the mass of the gauge is at least about 0.017 square meters per kilogram.

21. The stress and velocity gauge of claim 1, wherein the ratio of a transverse dimension of the gauge body to the dimension of the measuring axis is at least about 5.

* * * * *